(12) United States Patent  
Jenkins

(10) Patent No.: US 8,096,294 B1  
(45) Date of Patent: Jan. 17, 2012

(54) SPA WATER HEATING APPARATUS AND METHOD

(76) Inventor: Richard D. Jenkins, El Monte, CA (US)

( * ) Notice: Subject to any disclaimer, the term of this patent is extended or adjusted under 35 U.S.C. 154(b) by 655 days.

(21) Appl. No.: 12/287,196

(22) Filed: Oct. 8, 2008

(51) Int. Cl.  
*F24J 2/36* (2006.01)

(52) U.S. Cl. ........ 126/624; 126/626; 126/627; 126/704; 126/705

(58) Field of Classification Search .......... 126/561–568, 126/624, 626, 627, 704, 705  
See application file for complete search history.

(56) References Cited

U.S. PATENT DOCUMENTS

| | | | |
|---|---|---|---|
| 2,895,143 A * | 7/1959 | Seitz | 4/500 |
| 3,555,573 A * | 1/1971 | Turner | 64/35 |
| 3,684,460 A * | 8/1972 | Ameson | 422/265 |
| 4,079,726 A * | 3/1978 | Voelker | 126/566 |
| 4,082,081 A * | 4/1978 | McColgan et al. | 126/565 |
| 4,190,038 A | 2/1980 | Heitland et al. | |
| 4,256,087 A | 3/1981 | Sowers | |
| 4,408,459 A | 10/1983 | Yogev | |
| 4,422,192 A * | 12/1983 | Jacobs | 4/498 |
| 4,660,545 A | 4/1987 | Ely | |
| 4,713,492 A * | 12/1987 | Hanak | 136/245 |
| 5,086,525 A * | 2/1992 | Christopher | 4/498 |
| 6,080,927 A * | 6/2000 | Johnson | 136/248 |
| 6,295,818 B1 * | 10/2001 | Ansley et al. | 60/641.8 |
| 6,675,580 B2 * | 1/2004 | Ansley et al. | 60/641.8 |
| 2003/0188737 A1 * | 10/2003 | Swanljung | 126/565 |
| 2005/0188456 A1 * | 9/2005 | Teitelbaum | 4/498 |
| 2006/0070620 A1 * | 4/2006 | Swanljung | 126/566 |
| 2006/0180142 A1 | 8/2006 | Rosene et al. | |
| 2008/0202498 A1 * | 8/2008 | Ramos | 126/626 |
| 2008/0282461 A1 * | 11/2008 | Sneed | 4/498 |
| 2008/0302357 A1 * | 12/2008 | DeNault | 126/704 |

* cited by examiner

*Primary Examiner* — Kenneth Rinehart  
*Assistant Examiner* — Jorge Pereiro  
(74) *Attorney, Agent, or Firm* — William W. Haefliger

(57) ABSTRACT

An integrated spa water heating assembly comprising a solar water heater panel, having a water inlet and outlet, an electrical motor/pump unit attached to the panel and having ducting for drawing water from the spa interior for passage to the panel inlet, the panel operating to discharge heated water flowing from the panel back into the spa water, and a solar power panel operatively attached to the heater panel, and electrically connected with the motor to power motor operation.

16 Claims, 3 Drawing Sheets

SPA WATER HEATING APPARATUS AND METHOD

BACKGROUND OF THE INVENTION

This invention relates generally to spa water heating apparatus and method; and more particularly concerns improvements in installation and use of solar heating of spa water as well as solar powering of pumping means to displace spa water into and out of the solar heating apparatus, all in highly efficient and safe manner.

There is need for equipment featuring the above improvements in solar powering of spa water displacement in relation to solar heating of displaced water. Also, there is need for improvements in installation of such equipment and in relation to accommodation to spa covers, which are removable from positions over spas.

SUMMARY OF THE INVENTION

It is a major object of the invention to provide methods and means meeting the above needs. Basically, and in its apparatus aspects, the invention is embodied in an integrated spa water heating assembly, which comprises:

a) a solar water heater panel, having a water inlet and outlet, b) an electrical water/pump unit attached to the panel and having ducting for drawing water from the spa interior for passage to the panel inlet, the panel operating to discharge heated water flowing in the panel back into the spa water, c) and a solar power panel operatively attached to the heater panel, and electrically connected with the motor to power motor operation.

As will appear, the heater panel typically includes multiple tubes, and water inlet and outlet manifolds at ends of the tubes, to accommodate roll up of the panel toward the motor/pump unit. The integrated assembly may be placed over the spa, when heating of spa water is desired, as may be facilitated by integration with a spa cover extended or installed over the top of the spa, whereby water may be easily withdrawn upwardly from the spa by water/pump operation, and displaced into and through the tubing in the solar heater panel, for collection and return downwardly into the spa.

Another object includes installation of the motor/pump unit and the solar power panel at one end of the heater panel, to enable roll-up of the heater panel toward both the motor/pump unit, and power panel. This also enables efficient multiple function use of the three elements—the water heater panel, the solar power panel, and the motor/pump unit powered by the power panel. Support of these elements by the spa cover is such as to enable ease of simultaneous removal off the spa, and fold-up of the cover, as during spa use.

An opening or openings in the cover enable downward extension of ducting from the pump unit, into the spa water, to facilitate water upward withdrawal, and circulation to the heater panel, and subsequent return to the spa.

Another object is to provide an integrated spa water heating system that comprises a) a spa cover having two folding sections, and supported on the spa for removal, b) a motor driven pump removably supported on the cover, and an intake water duct extending from the pump downwardly through the cover into the spa, c) a solar heater removably supported on the cover near the water driven pump assembly, and electrically connected with the motor for effecting motor operation to drive the pump, d) a solar heated panel to receive water from the pump and to discharge heated water back with into the spa, e) the cover having openings to pass said intake duct, and also to discharge heated water from the solar heated panel downwardly into the spa.

As will be seen, manifolds may be provided to pass intake water from the pump into multiple passages in the solar panel, and to collect heated water form said passages for discharge into the spa.

A further object include provision of a method of use of the integrated system that includes:

f) removing the motor driven pump assembly and solar panel off the cover when water heating is to be discontinued, and for their storage, g) then removing the cover from the spa for folding of said sections and storage, h) then using the spa, i) subsequently replacing the cover back onto the spa when water heating is desired, j) and replacing the motor driven pump assembly and solar heating panel back onto the cover on the spa, and allowing sunlight to heat the panel and to activate the solar panel for operating the motor and motor driven pump, for spa water cyclic displacement and heating and return to the spa.

Further, the method may include rolling up the solar panel after the above f) step; and provision of a support panel on which the motor driven pump assembly and solar panel are supported on the cover during said f) and j) steps.

These and other objects and advantages of the invention, as well as the details of an illustrative embodiment, will be more fully understood from the following specification and drawings, in which:

DRAWING DESCRIPTION

FIG. 1 is a plan view showing preferred system components assembled onto a spa;

FIGS. 2 and 3 are section views taken on lines 2-2 and 3-3 of FIG. 1;

DETAILED DESCRIPTION

Figure 1:
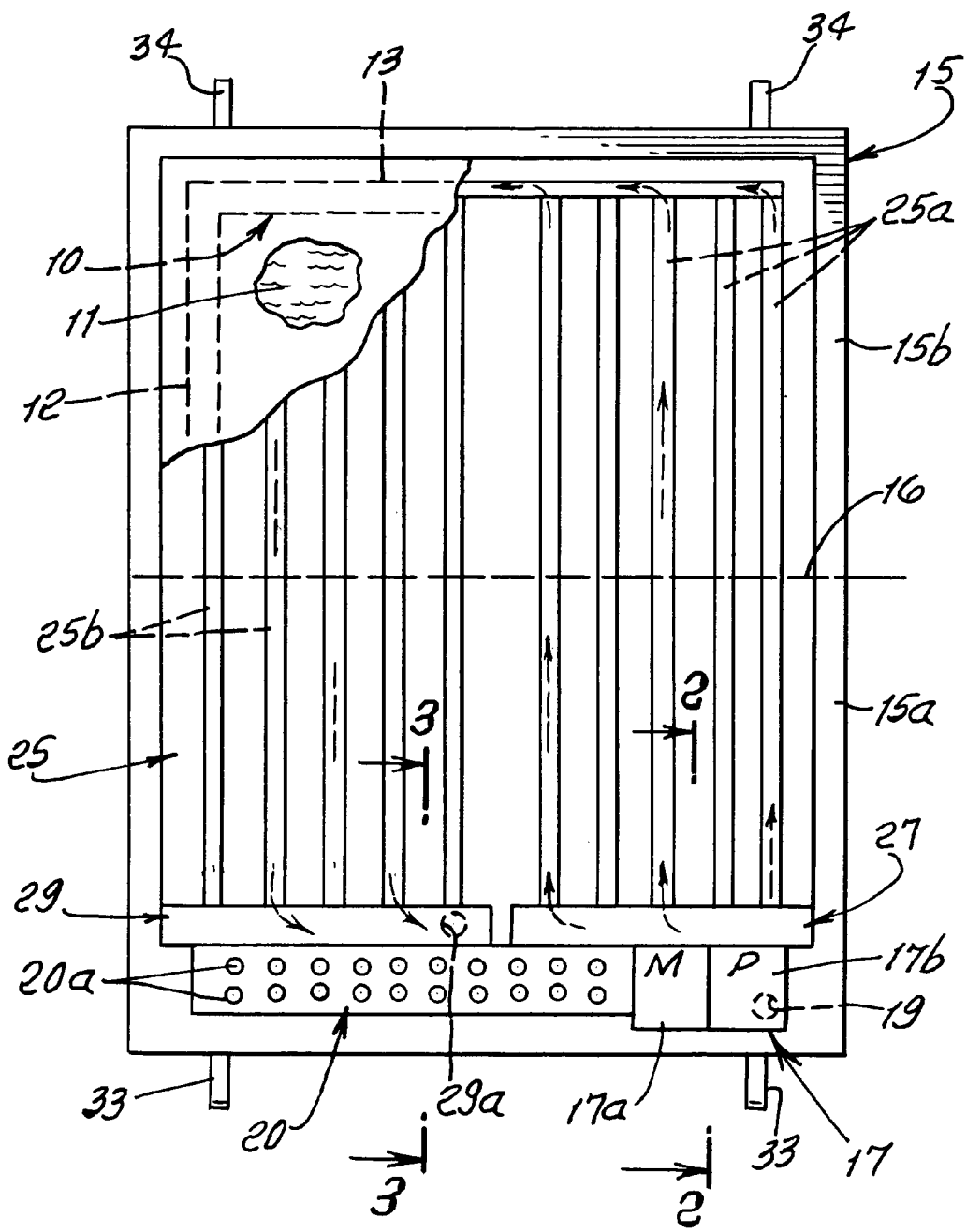
Figure 2:
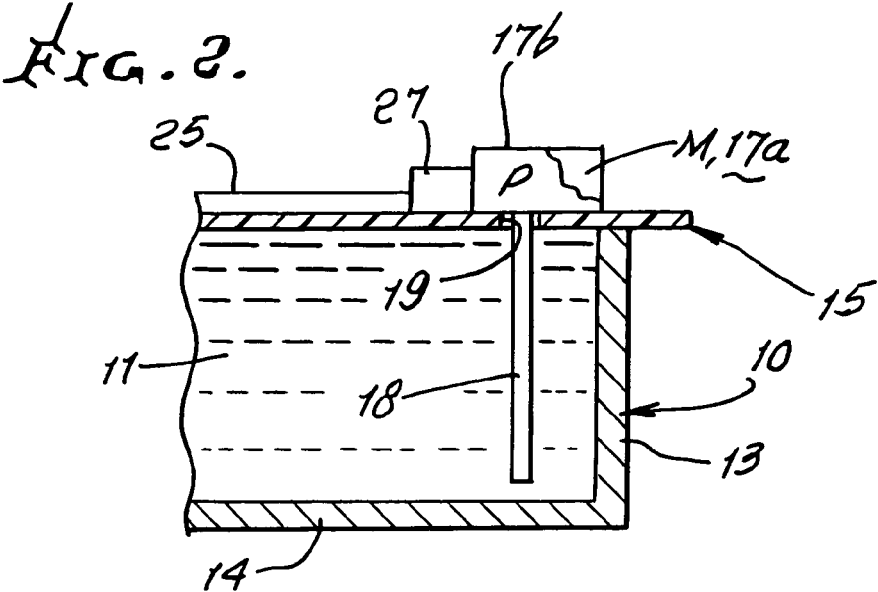
Figure 3:
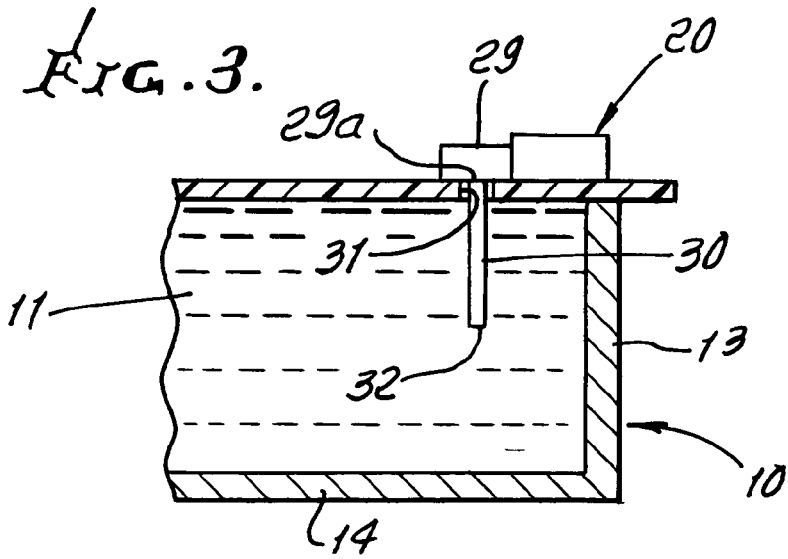

In FIGS. 1-3, a spa 10 contains water 11, and has upstanding side and end walls 12 and 13, and a bottom wall 14. A spa cover 15 extends over and seats on the upper edges of the walls, and may be removed by lifting off the spa, for storage. It may have two sections or halves 15a and 15b, hinge connected at 16. A motor driven pump assembly 17 is removably supported on the cover 15. It includes electrical motor 17a and a pump unit 17b driven by the motor, when electrically energized. A hose or duct 18 extends downwardly from the intake side of the pump, through an opening 19 in the cover, and down into the spa water 11.

Figure 5:
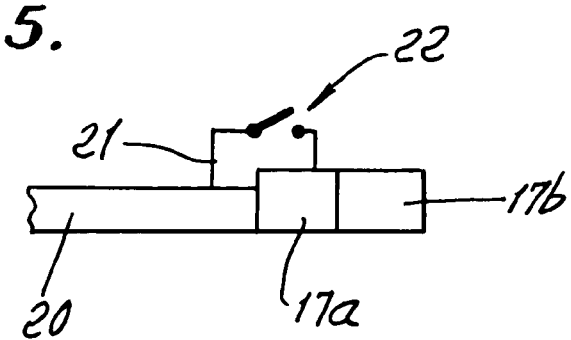
FIG. 5 is a plan view showing on electrical connection and disconnection means.

A solar power panel 25 is removably supported on the cover 15, for example near the motor driven pump unit or assembly, and is electrically connected with the motor, as at 21 in FIG. 5, for effecting motor operation to drive the pump. A switch 22 may be provided to electrically connect or disconnect the panel 20 with the motor. When connected, the motor operates to drive the pump for pumping water from the spa, via duct 18, and to a solar heater panel 25. Solar powered cells appear at 20a.

Panel 25 is removably supported by the cover 15, and extends lengthwise and endwise away from 17 and 20 to receive water from the pump, to flow in panel passages 25a, to be progressively heated by sunlight, impinging on the panel, which may consist of flexible plastic material forming multiple parallel such passages. A manifold 27 is shown to receive water from the pump, and to deliver water to the multiple passages 25a entrances. Passages 25a and 25b may be generally tubular.

Water passes through return passages 25b in the panel 25, and into a second manifold 29. Water flows in that manifold to an outlet 29a, and downwardly via duct 30 through a second opening 31 through the panel, for discharge at 32 back into the spa. For compactness, the manifolds 27 and 29 extend adjacent the solar heating panel and the motor driven pump assembly, at an end of the solar panel 25 a base cover section 15a. this enables roll-up of the plastic panel 25 toward and into adjacency to components 27, 29, 17, and 20, for compact storage.

Figure 4:
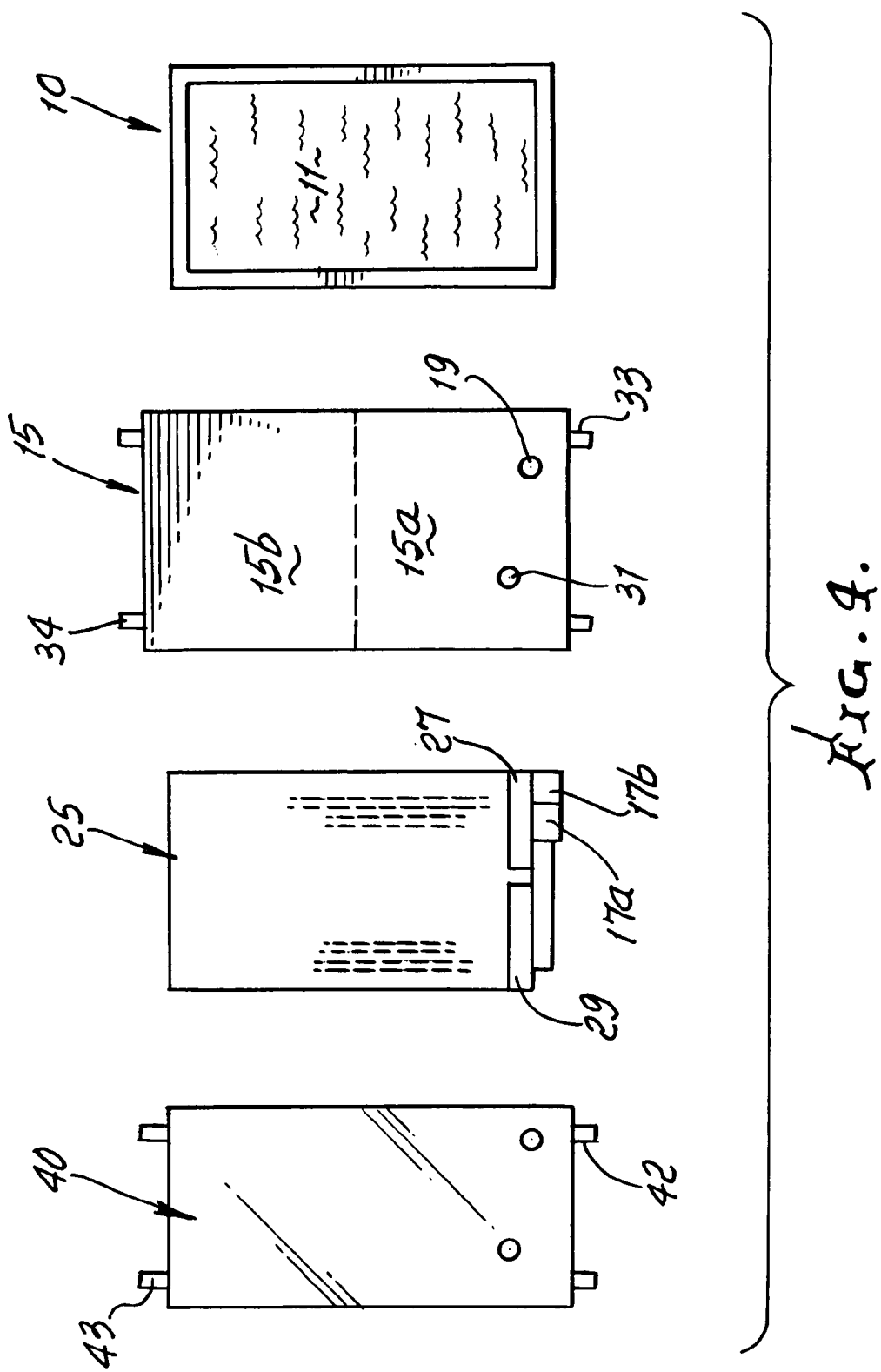
FIG. 4 is a composite showing system components removed off a spa.

FIG. 4 shows the elements in disassembled relation, off the spa, whereby the cover may be folded and stored separately from the components 27, 29, 17 and 20, which may be separately compactly stored as referred to.

Handles 33 and 34 on the cover sections 15a and 15b enable normal pick-up of the cover with the elements 17, 20, 19, 29a, 25 supported on the cover sections, for in-place storage, and easy and accurate return onto the spa, for heating. Alternatively, those elements may be removed off the cover, to facilitate that, an auxiliary support panel may be utilized, to support the elements 17, 20, 19, 29a and 25, apart from the cover, and may be moved onto or off the cover, as needed. See such a support panel 40, in FIG. 4, with handles at 42 and 43. Holes 131 and 119 align with hole 31 and 19, when the support panel is seated on the cover 15.

In a modification, the motor driven pump assembly 17 may be positioned within the spa, submerged below water surface level. A water delivery duct then connects the pump outlet to the manifold 27, and may be used to support the assembly 17, for lifting out of the spa. The pump intake side is then directly exposed to water 11.

The described pumps may be self-priming, or priming bulbs can be used.

I claim:

1. An integrated spa water heating system, comprising
    a) a spa cover having two folding sections, and supported on the spa for removal,
    b) a motor driven pump removably supported on the cover, and an intake water duct extending from the pump downwardly through the cover into the spa,
    c) a power source supported on the cover near the motor driven pump assembly, and electrically connected with the motor for effecting motor operation to drive the pump,
    d) a solar heated panel to receive water from the pump and to discharge heated water back into the spa, the panel removably supported on the cover,
    e) the cover having openings to pass said intake duct, and to pass heated water from the solar heated panel downwardly into the spa,
    f) and there being a support panel in association with said cover and on which the pump assembly and solar panel are supported prior to removal thereof with the cover when water heating is to be discontinued.

2. A method of using an integrated spa water heating system, comprising
    a) a spa cover having two folding sections, and supported on the spa for removal,
    b) a motor driven pump removably supported on the cover, and an intake water duct extending from the pump downwardly through the cover into the spa,
    c) a solar heated power generator removably supported on the cover near the water driven pump assembly, and electrically connected with the motor for effecting motor operation to drive the pump,
    d) a solar heated panel to receive water from the pump and to discharge heated water back into the spa, the panel removably supported on the cover,
    e) the cover having openings to pass said intake duct, and to pass heated water from the solar heated panel downwardly into the spa, said method includes:
    f) removing said motor driven pump assembly and said solar heated panel off the cover when water heating is to be discontinued, and for storage,
    g) then removing the cover from the spa for folding of said sections and storage,
    h) then using the spa,
    i) subsequently replacing the cover back onto the spa when water heating is desired,
    j) and replacing the motor driven pump assembly and solar heated panel back onto the cover on the spa, and allowing sun light to heat the panel and to activate the solar generator for operating the motor and motor driven pump, for spa water cyclic displacement and heating and return to the spa,
    k) and providing a support panel in association with said cover and on which the motor driven pump assembly and solar panel are supported during said f) and j) steps.

3. The system method of claim 2 including providing manifolds to pass intake water from the pump into multiple passages in the solar panel, and to collect heated water from said passages for discharge into the spa.

4. The method of claim 2 including rolling up the solar panel after said f) step.

5. The method of claim 2 including providing handles on the cover, for lifting of the cover off the spa, with the motor pump assembly, solar heated panel and power generator thereon.

6. The method of claim 2 including providing lifting handles on the support panel.

7. A method of using an integrated spa water heating assembly comprising:
    a) a solar water heater panel, having a water inlet and outlet,
    b) an electrical motor/pump unit attached to the panel and having ducting for drawing water from the spa interior for passage to the panel inlet, the panel operating to discharge heated water flowing from the panel back into the spa water,
    c) a solar power panel operatively attached to the heater panel, and electrically connected with the motor to power motor operation,
    d) a solar heated power generator removably supported on the cover near the pump unit assembly, and electrically connected with the motor for effecting motor operation to drive the pump,
    e) a spa cover supportively associated with said heater panel, the heater panel, solar panel and motor/pump unit supportively carried by the cover, over the spa, said method including:
    f) removing said motor/pump unit and said solar heated panel off the cover when water heating is to be discontinued, and for storage,
    g) then removing the cover from the spa,
    h) then using the spa,
    i) subsequently replacing the cover back onto the spa when water heating is desired, j) and replacing the motor/pump unit and solar heated panel back onto the cover on the spa, and allowing sun light to heat the panel and to activate the solar generator for operating the motor and motor driven pump, for spa water cyclic displacement and heating and return to the spa, k) and providing a support panel in association with said cover and on which the motor/pump unit and solar panel are supported during said f) and j) steps.

8. The assembly of claim 7 wherein the heater panel includes multiple tubes, and including water inlet and outlet manifolds at ends of the tubes, to accommodate roll up of the panel toward the water pump unit.

9. The method of claim 7 wherein the motor/pump unit and solar power panel are provided at one end of the heater panel, to enable roll up of the heater panel toward both the motor/pump unit and power panel.

10. The method of claim 7 wherein the heater panel, solar panel and motor/pump unit are provided to be carried by the cover, over the spa.

11. The method of claim 10 wherein the cover is provided to have first and second sections hingedly interconnected to enable folding, and the heater panel, solar panel, and motor/pump unit are carried by the first section of the cover.

12. The method of claim 10 including providing a primary through opening in the cover receiving water intake ducting extending into water in the spa interior and upwardly to the pump, above the cover.

13. The method of claim 12 including providing a secondary through opening in the cover receiving secondary ducting discharging water heated by the heater panel back into the spa.

14. The method of claim 13 wherein said primary and secondary ducting are located at one corner of the cover, for local access to the spa interior.

15. The method of claim 10 including providing a switch in a power line extending between the solar power panel and said motor.

16. The method of claim 7 wherein the solar power panel and the motor driven pump assembly are provided to be located at one end of the solar heater panel.

\* \* \* \* \*